United States Patent [19]

Stang

[11] Patent Number: 4,938,580

[45] Date of Patent: Jul. 3, 1990

[54] FLEXIBLE OPTICAL FILTER STORAGE SYSTEM

[76] Inventor: Michael A. Stang, 26 Stockmill Rd., Apt. F, Pikesville, Md. 21208

[21] Appl. No.: 347,724

[22] Filed: May 5, 1989

[51] Int. Cl.$^5$ .............................................. G02C 9/00
[52] U.S. Cl. ........................................ 351/47; 351/57
[58] Field of Search ...................... 351/44, 47, 57, 45; 350/314, 315

[56] References Cited

U.S. PATENT DOCUMENTS

2,423,272  7/1947  Thornton .............................. 351/47
3,603,672  9/1971  Bastide .................................. 351/47

Primary Examiner—Paul M. Dzierzynski

[57] ABSTRACT

A flexible optical filter storage system (10, 100) is provided for deployment as sunglasses. Systems (10 and 100) include a flexible filter member (40) reversibly extendible from within a unitary housing (30). Flexible filter member (40) is a one-piece singular member being concurrently displaceable over and retractable from both lenses (24) of eyeglasses (20), or in an alternate embodiment, concurrently displaceable over both eyes of the user. The housing (30) contains a roller member (52) rotatably mounted therein for storage of the flexible filter member (40). Also provided within housing (30) is an extension/retraction assembly (50) coupled to roller member (52). In the alternate embodiment, storage system (100) includes bridge support assembly (170) hingedly coupled to housing (30) and extendible therefrom for supporting housing (30) above a user's nose. On opposing ends of housing (130) there is provided ear supports (142) pivotally coupled within an elongated recess (131) for storage of ear supports (142) therein.

19 Claims, 6 Drawing Sheets

FLEXIBLE OPTICAL FILTER STORAGE SYSTEM

BACKGROUND OF THE INVENTION

1. FIELD OF THE INVENTION

This invention directs itself to flexible optical filter systems and the storage thereof. In particular, this invention directs itself to a compact storage system having a unitary longitudinally extended housing and a flexible filter member reversibly extendible from within the housing. Still further, this invention directs itself to flexible optical filter storage systems wherein the flexible filter member forms a one-piece singular member being concurrently displaceable over and retractable from both lenses of a pair of eyeglasses, or both eyes of the user. More in particular, this invention pertains to flexible optical filter storage systems deployable as sunglasses which can be clipped onto glasses or in another embodiment may have ear support members extendable from the unitary housing to form standard sunglasses.

2. PRIOR ART

Flexible optical filters and storage systems are known in the art. The best prior art known to the Applicant include U.S. Pat. Nos. 3,603,672; 2,423,272; 1,969,710; 1,588,685; 4,217,037; 4,730,915; 4,685,782; 2,511,329; 2,444,512; 1,596,810; 1,441,487; 1,476,336; 1,571,019; and, 3,183,033.

Some prior art such as shown in U.S. Pat. No. 3,603,672 are directed to devices for controlling the amount of light rays in an optical instrument. A pair of flexible filter elements are each separately supported between a pair of spools which are fitted to a pair of ordinary glasses by means of resilient clips. The filter element has different characteristics throughout its length, the portion having the desired characteristic being adjusted to overlay the respective lenses of the glasses. Thus, this system does not truly provide a means for storage of the optical filter when solar protection is not required, as a transparent portion is selected to overlay the lens when protection is not required.

In other prior art systems such as U.S. Pat. No. 2,423,272, flexible filter elements are combined with ordinary spectacles. Although in this system, the flexible filter element may be retracted on a spool located within a housing, the housing is not removable from the spectacles. Further, the filter element for each lens is independent and not displaced over the lenses in a concurrent fashion.

SUMMARY OF THE INVENTION

A flexible optical filter storage system adapted to be releasably coupled to an upper section of an eyeglass frame having a pair of lenses is provided. The storage system includes a unitary housing extending substantially along a longitudinal axis and a flexible filter member reversibly extendible from within the housing. The filter member forms a one-piece singular member being displaceable over and retractable from both of the eyeglass lenses, concurrently. The flexible optical filter storage system further includes a means for releasably coupling the housing to an upper portion of the eyeglass frame, and a means for extension and retraction of the flexible filter member from within the housing.

DESCRIPTION OF THE PREFERRED EMBODIMENTS

Referring now to FIGS. 1–19, there is shown flexible optical filter storage systems 10 and 100 adapted to be deployed as sunglasses. As will be seen in following paragraphs, flexible optical filter storage system 10 is specifically adapted to be releasably coupled to an upper section 22 of an eyeglass frame 20, to form a clip-on type sunglass, while system 100 is specifically directed to the concept of conversion from a storage system to a pair of sunglasses. Although not restricted to optical filters utilized for protection of an individual's eyes from solar radiation, flexible optical filter storage systems 10 and 100 are particularly adapted to provide a convenient means for storage of a flexible filter member 40 within a housing 30, 130, respectively, from which the filter can easily be extended for use. When not being used for eye protection, flexible optical filter storage systems 10 and 100 provide a compact and secure means for storage of the flexible optical element 40, suitable for placement in a shirt pocket or suspended from a chain about the neck.

Referring now to FIGS. 1–8, flexible optical filter storage system 10 is adapted to be releasably coupled to an upper section 22 of an eyeglass frame 20 having a pair of lenses 24. Storage system 10 includes a unitary longitudinally extended housing 30 from which a flexible filter member 40 is reversibly extendable. Filter member 40 is a singular one-piece member being displaceable over and retractable from both of eyeglass lenses 24 concurrently by means of an extension/retraction assembly 50. Unitary housing 30 is releasably coupled to the upper portion 22 of eyeglass frame 20 by means of a pair of spring clips 32 longitudinally spaced one from the other on housing 30.

Extended lower edge 42 of flexible filter 40 may be provided with clips, not shown, for coupling to a bottom edge of eyeglass frame 20, as is similarly done in clip-on type sunglasses, well known in the art. However, there is typically sufficient electrostatic charge induced on filter 40 to provide an electrostatic attraction between filter 40 and lenses 24, to maintain the lower edge 42 in contiguous contact with lenses 24.

Figures 1, 2, 3:
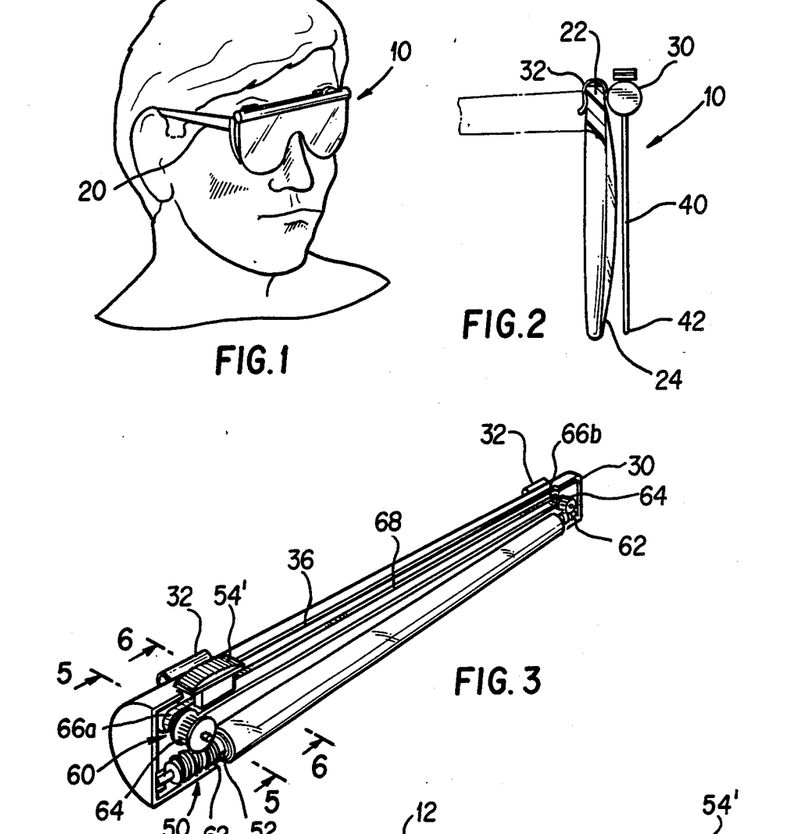
FIG. 1 is a perspective view of the storage system deployed as clip-on sunglasses.
FIG. 2 is a side elevation view of the deployed storage system.
FIG. 3 is a perspective cut-away view of the storage system.
Figure 4:
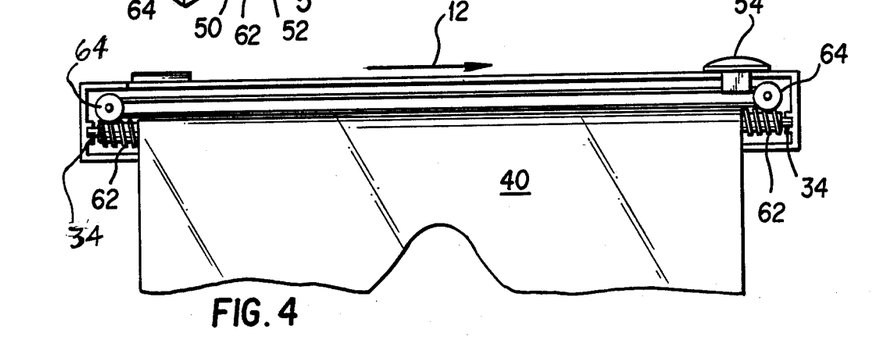
FIG. 4 is a cut-away plan view of the storage system.
Figure 5:
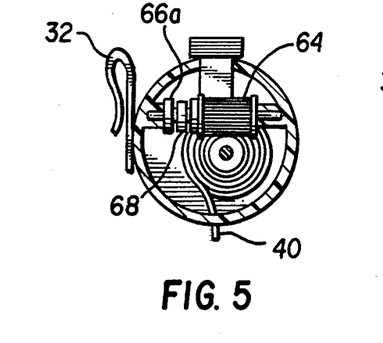
FIG. 5 is a sectional view of the storage system taken along the Section Line 5—5 of FIG. 3.

As shown in FIGS. 3 and 4, flexible filter 40 is extended from, or retracted onto a roller, or spool, 52 rotatably mounted within housing 30. Roller 52 extends longitudinally coaxial with the axis of housing 30. The opposing ends of roller 52 are supported within bosses 34 formed in opposing ends of housing 30. Each boss 34 is provided with a bore having sufficient diameter to permit the unimpeded rotation of roller 52.

The extension/retraction assembly 50 includes a drive assembly 60 which includes at least one worm gear 62 coupled to roller 52 on one end thereof. Worm gear 62 is engaged by a gear 64 which is in turn coupled to a first pulley 66a. Gear 64 and first pulley 66a rotate about a common pivot located adjacent one end of housing 30. A drive belt 68 rotatably couples first pulley 66a with a second pulley 66b pivotedly coupled adjacent the opposing end of housing 30. Drive assembly 60 further includes a knob 54' fixedly coupled to drive belt 68 and extending upwardly through an elongated slotted opening 36 formed in housing 30 for permitting knob 54' to be slidingly displaced longitudinally from one end of slotted opening 36 to the other, as indicated by the direction arrow 12, shown in FIG. 4.

Linear displacement of knob 54' likewise causes a linear displacement of drive belt 68, which in turn causes the rotation of pulley 66a and gear 64. Rotation of gear 64 causes roller 52 to be rotated, by virtue of the engagement of worm gear 62 with gear 64, and thereby causing the extension of flexible filter 40 from housing 30 for providing the desired eye protection. When it is desired to retract flexible filter 40 knob 54' is displaced in the opposite direction, which causes a respective reversal in the direction of gear 64, and thereby reverses the direction of roller 52 for retraction of filter 40.

To enhance the reliability of flexible optical filter storage system 10 drive assembly 60 may incorporate a pair of worm gears 62. Each worm gear 62 being located on opposing ends of roller 52 and each engaged to a respective gear 64. Each gear 64 is coupled to a respective pulley 66a or 66b, both driven by linear displacement of drive belt 68.

Figure 6:
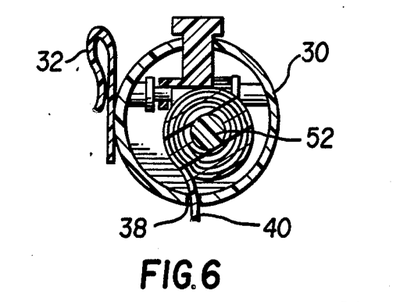
FIG. 6 is a sectional view of the storage system taken along the Section Line 6—6 of FIG. 3.

As shown in FIG. 6, flexible filter 40 extends from, and is retracted through a longitudinal slotted through opening 38. Although not important to the inventive concept, slotted through opening 38 and slotted through opening 36 are located on opposing sides of housing 30. This arrangement provides a convenient means for forming housing 30 from molded or die cast parts wherein slotted openings 36 and 38 would be centered on the parting line between two members which together form housing 30.

Figure 7:
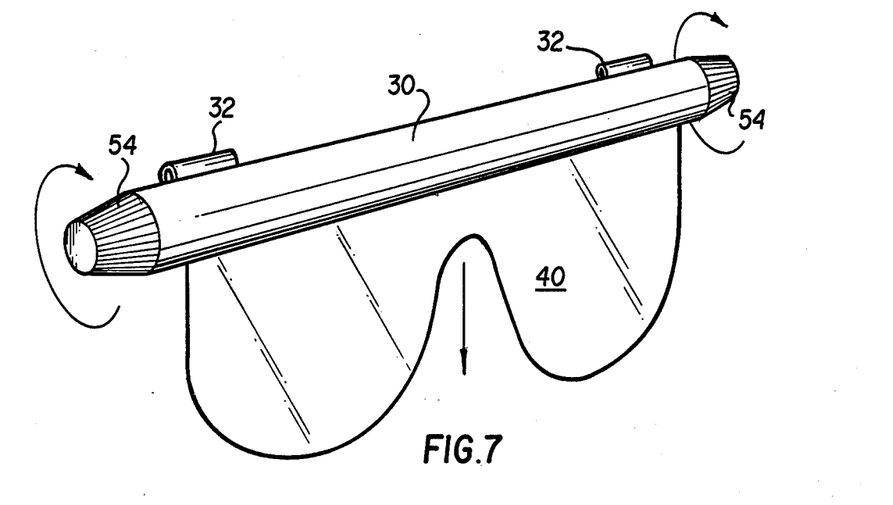
FIG. 7 is a perspective view of one embodiment of the storage system.
Figure 8:
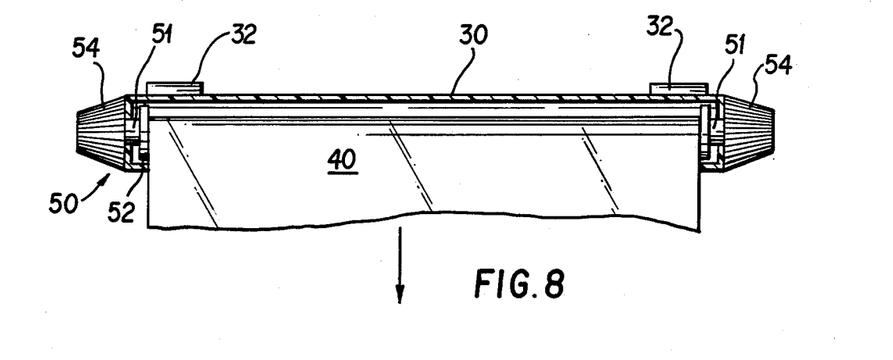
FIG. 8 is a cut-away plan view of one embodiment of the storage system.

Flexible optical filter storage system 10 and 100 may incorporate a more simple extension/retraction assembly 50 wherein the roller 52 is directly coupled to a knob assembly for extension and retraction of the flexible filter 40. As shown in FIGS. 7 and 8, a pair of knobs 54 are fixedly coupled to opposing ends of roller 52. Opposing end portions of roller 52 may extend through respective openings in opposing ends of housing 30 for coupling with knobs 54. In the alternative, knobs 54 may include a shaft portion which extends through the opposing end portions of housing 30 for coupling with roller 52. In yet another alternative, knobs 54 and roller 52 may be integrally formed, as a one-piece formation for rotative coupling through the end walls of housing 30.

The roller 52 or knobs 54 may incorporate detents or means to resist rotation of roller 52. In one embodiment, the shafts 51 coupled to roller 52 are dimensioned for a sufficiently close fit with the through openings formed in the end walls of housing 30 for resisting rotation thereof. In this way the extended or retracted position of flexible filter 40 is not altered by jarring or vibration. In yet another embodiment, knob 54 is formed with a plurality of projections, or detents, extending from a bottom surface (not shown). These projections provide frictional resistance with the exterior end wall surface of housing 30 to provide the desired resistance of roller 52.

Figure 9:
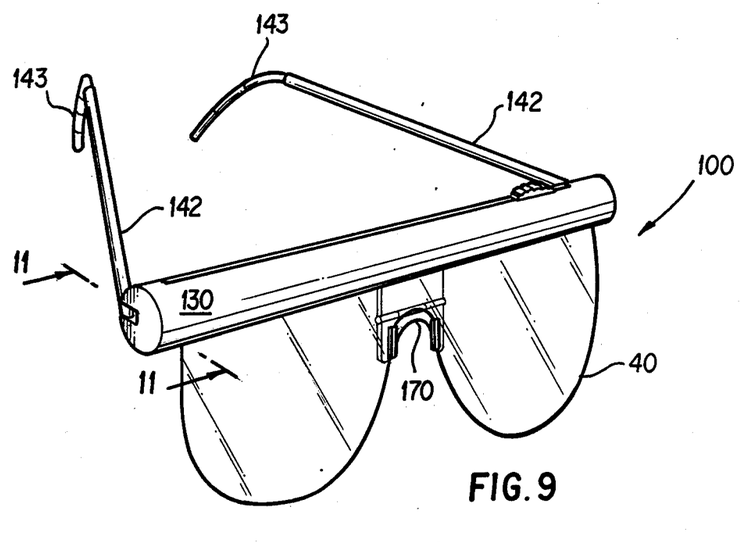
FIG. 9 is a perspective view of another embodiment of the storage system deployed as sunglasses.
Figure 10:
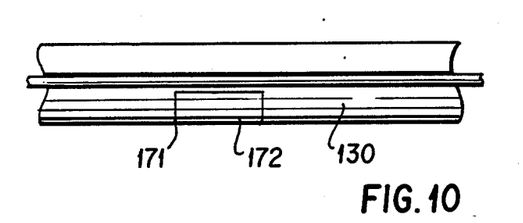
FIG. 10 is a plan view of a portion of the storage system housing.

Referring now to FIG. 9, there is shown a flexible optical filter storage system 100 adapted to be deployed as sunglasses, wherein a unitary longitudinally extended housing 130 forms both a storage container for the flexible filter 40 and a frame for the deployed sunglasses. System 100 includes an extendable nose support 170 and a pair of ear supports 142, each having a flexible distal end 143 which may be arcuately formed over the ear of the user.

Referring now to FIGS. 10–13, nose support 170 includes a first member 172 coupled to an aperture formed in housing 130 by hinge 175. First member 172 is provided with a cross-sectional contour substantially matching the contour of that portion of housing 30 wherein the aperture 171 is formed. Thus, when first member 172 covers aperture 171, such forms a contiguous contour with that of housing 30. First member 172 being hingedly coupled on one end to housing 30 is coupled on the opposing end to a second member 174 by hinge 176.

Figure 11:
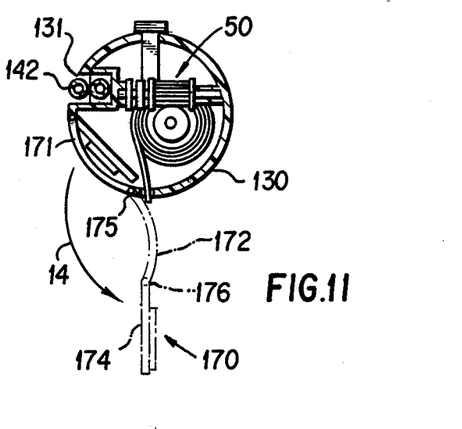
FIG. 11 is a sectional view of the storage system taken along the Section Line 11—11 of FIG. 9.
Figure 12:
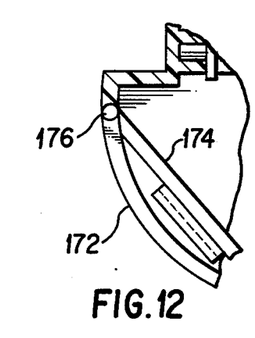
FIG. 12 is an enlarged sectional view of a portion of the storage system shown in FIG. 11.
Figure 13:
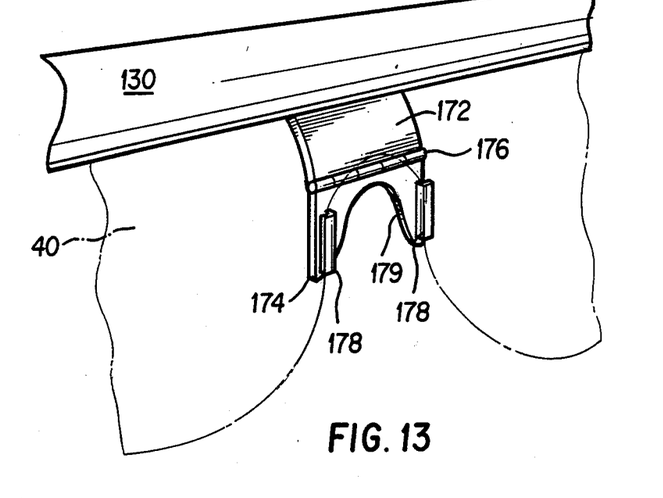
FIG. 13 is a perspective view of a portion of the storage system deployed sunglasses.

This arrangement, as shown in FIGS. 11 and 12, allows second member 174 to be folded back against first member 172 for storage within housing 130. Nose support 170 is deployed by unfolding second member 174 and allowing first member 172 to swing down as indicated by direction arrow 14.

For improvement of the positional stability of filter 140, second member 174 is provided with a pair of clip members 178 for engagement with an edge portion of filter 40. Second member 174 is formed with a cutout region 179 having a shape adapted for matingly interfacing with the bridge portion of the user's nose, and thereby provide a suitable nose support for the deployed sunglasses.

Figure 14:
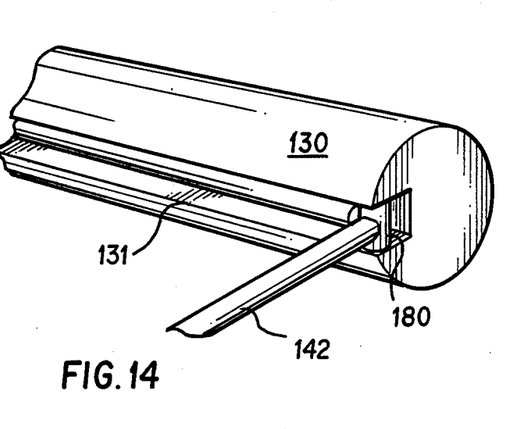
FIG. 14 is a partial perspective view of the storage system showing the ear support coupling and storage.
Figures 15, 16, 17, 18:
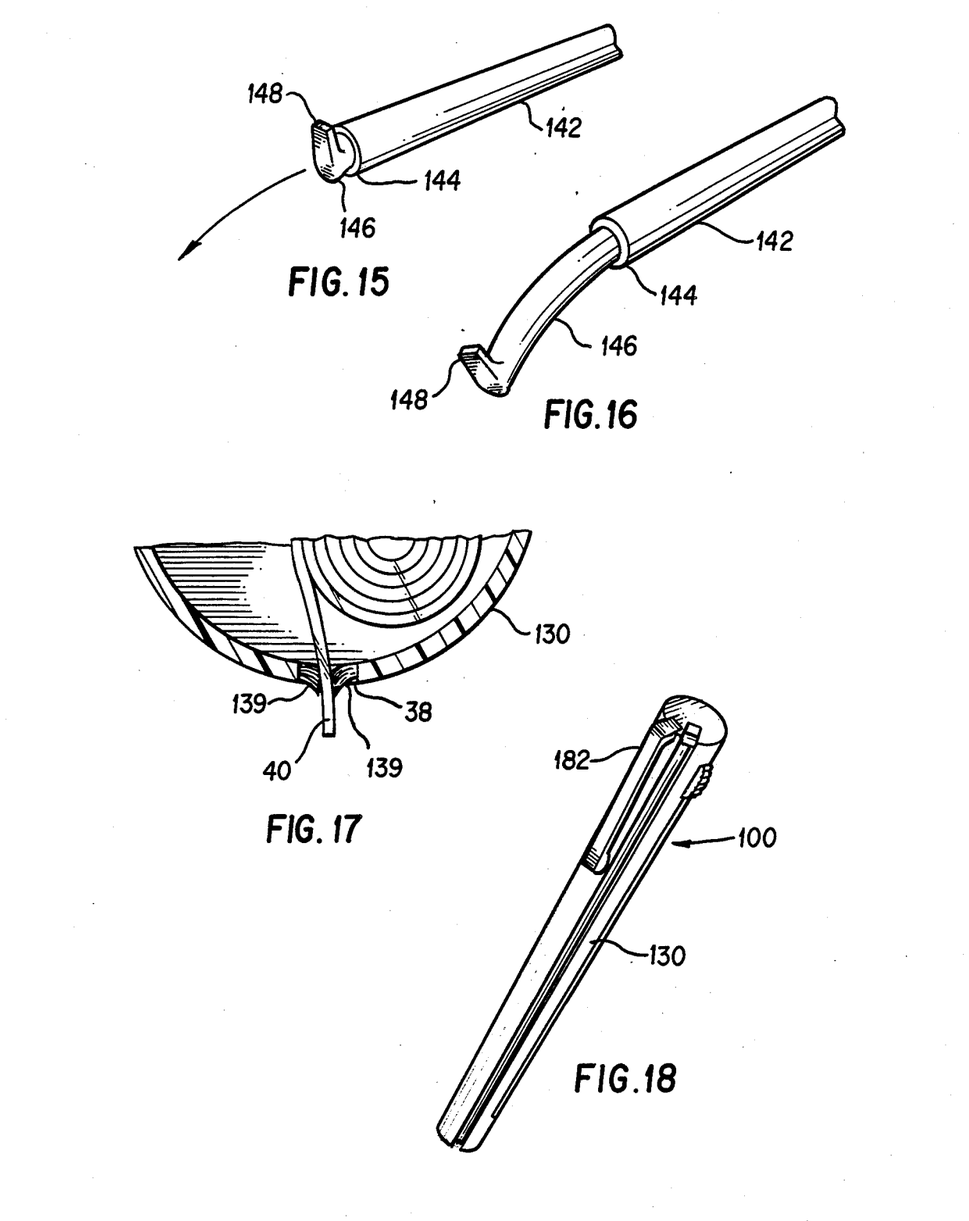
FIG. 15 is a perspective view of an ear support with a flexible end piece retracted.
FIG. 16 is a perspective view of a portion of the ear support showing the flexible extension extended therefrom.
FIG. 17 is an enlarged cut-away view of the storage system showing the means for cleaning the filter member.
FIG. 18 is a perspective view of the storage system adapted for placement in a shirt pocket; and, FIG. 19 is a perspective view of the storage system adapted to be worn about the neck of a user.

Referring now to FIGS. 14–16, ear support members 142 are pivotedly coupled to opposing ends of housing 130 by means of a pivot coupling 180. Pivot coupling 180 is rotatably mounted within a longitudinally extended recess 131 formed in housing 130. Recess 131 is of sufficient dimension to allow both of ear support members 132 to be disposed therein for storage. Thus, the compact storage configuration for system 100 is maintained.

Ear support members 142 are constructed from tubular material having an open distal end from which a flexible member 146 can be extended. Flexible, member 146 may be formed of a soft plastic, or a plastic material having a soft metal core to allow the user to form member 146 in an arcuate contour, which will retain its shape until changed by the user. To aid in the extension and retraction of member 146 the distal end of member 146 is provided with a projection 148. Projection 148 further serves to limit the retraction of member 146 such that it cannot be inserted too far into the tubular ear support member 142.

Figure 19:
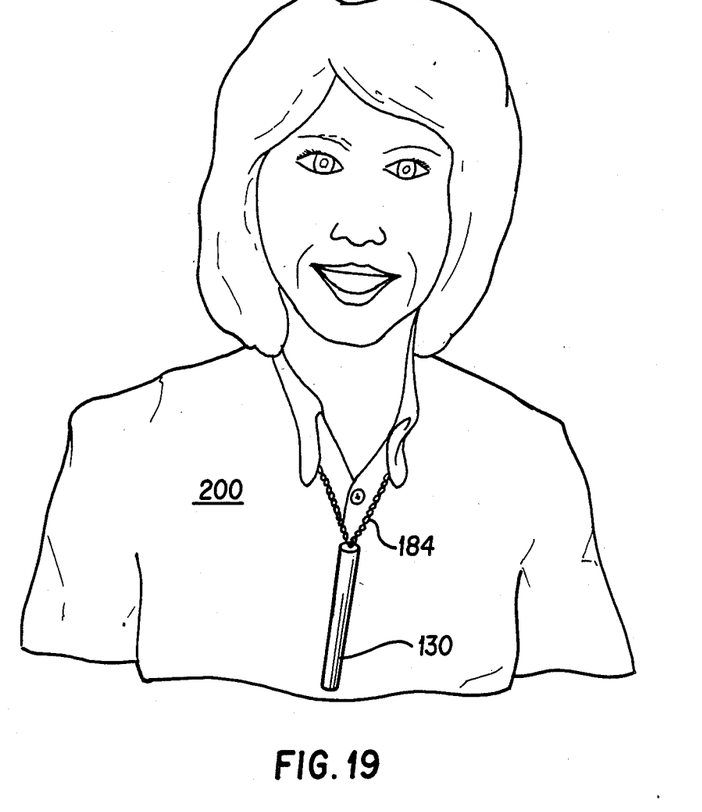

The features shown in FIGS. 17-19, although described for the flexible optical filter storage system 100, also apply to storage system 10.

As shown in FIG. 11, the elongated slotted through opening 38 formed in housing 130 for passage of flexible filter 40 is provided with a means for cleaning filter 40. Opposing longitudinal sides of slotted through opening 38 is provided with a plurality of bristles 139 which brush the opposing surfaces of filter 140 as it is extended from or retracted into housing 130. Bristles 139 may be formed of specifically selected materials for the induction of an electrostatic charge on filter 40, as may be required for a clip-on type sunglass assembly, as previously described.

Referring now to FIGS. 18 and 19, there is shown convenient means for maintaining storage system 100 when the filter 140 is not being utilized. System 100 being of the approximate size and contour of a fountain pen, may be provided with a pocket clip 182 for placement within a shirt or jacket pocket. Alternately, a chain 184 may be coupled to an end or opposing ends of housing 130, having sufficient length to enable it to be worn around the neck of the user 200, providing easy access when required for deployment.

Thus, flexible optical filter storage systems 10 and 100 provide a unitary longitudinally extended housing having a roller 52 rotatably mounted therein for storage of a flexible filter 40. Roller 52 is coupled to an extension/retraction assembly 50 having a drive assembly 60 for extending and retracting filter 40 responsive to displacement of a control knob.

In one embodiment, control knob 54' is fixedly coupled to a drive belt 68, whose linear displacement causes rotation of a pair of spaced apart pulleys 66a and 66b. Each of pulleys 66a and 66b is rotatably coupled to a respective gear 64, each gear 64 being engaged with a respective worm gear 62. The two worm gears 62 are located on opposing ends of roller 52 for rotatably driving roller 52 responsive to linear displacement of the control knob 54'.

System 100 includes a nose support 170 formed by a pair of members 172 and 174 hingedly coupled one to the other, member 172 being hinged on opposing sides. On one side to housing 130 and on the opposing side to member 174. During storage of filter 40 nose support 170 is foldably secured within an aperture 171 of housing 130 and forming a contiguous contour therewith. Housing 130 is also provided with a longitudinally extended recess 131 adapted for storage of a pair of ear supports 142 each pivotedly coupled to opposing ends of housing 130 within recess 131.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A flexible optical filter storage system adapted to be releasably coupled to an upper section of an eyeglass frame having a pair of lenses, comprising:
   (a) a unitary housing extending substantially along a longitudinal axis;
   (b) a flexible filter member reversibly extendable from within said housing, said filter member forming a one-piece singular member being displaceable over and retractable from both of said eyeglass lenses concurrently;
   (c) coupling means for releasably coupling said housing to said upper portion of said eyeglass frame; and,
   (d) means for extension and retraction of said flexible filter member from within said housing including:
      (1) a longitudinally extended roller member rotatably mounted within said housing and extending coaxial said longitudinal axis for storage of said flexible filter member thereon, and;
      (2) rotative displacement means coupled to said roller member for extension of said flexible filter member responsive to said rotative displacement in a first direction and for retraction of said flexible filter member responsive to said rotative displacement in a second direction, said rotative displacement means including drive means disposed within said housing for rotating said roller member responsive to a linear displacement of a knob member coupled thereto.

2. The system as recited in claim 1 where said rotative displacement means includes knob means coupled to said roller member for rotation of said roller member responsive to rotation of said knob means.

3. The system as recited in claim 2 where said knob means includes detent means coupled to said roller member for resisting said rotation of said roller member.

4. The system as recited in claim 1 where said drive means includes:
   (a) at least one worm gear coupled to one end of said roller member;
   (b) at least one gear member drivingly engaged to said worm gear;
   (c) a first pulley member disposed at one end of said roller member and coupled to said gear member for rotation thereof;
   (d) a second pulley member disposed at an opposing end of said roller member;
   (e) a flexible drive member extending between said first and second pulley members in a continuous loop for causing rotation of said first and second pulley members responsive to a linear displacement thereof; and,
   (f) a knob member fixedly coupled to said flexible drive member and extending therefrom through a longitudinally directed slotted through opening formed in said housing.

5. The system as recited in claim 4 where said drive means includes a pair of worm gears coupled to said roller member on opposing sides thereof.

6. The system as recited in claim 5 where said drive means further includes a pair of gear members, each of said gear members being drivingly engaged to a respective one of said worm gears and coupled to a respective one of said first and second pulley members.

7. The system as recited in claim 1 where said coupling means includes a pair of longitudinally spaced apart U-shaped spring clips fixedly coupled to said housing.

8. A flexible optical filter storage system adapted to be deployed as sunglasses having a pair of lenses, comprising:
   (a) a unitary housing extending substantially along a longitudinal axis defining a frame member of said sunglasses;
   (b) a flexible filter member reversibly extendable from within said housing, said filter member defining said pair of sunglass lenses;
   (c) a bridge support means extendable from said housing for supporting said housing above a user's nose, said bridge support means including a first member hingedly coupled to said housing and having a cross-sectional contour contiguous with a cross-sectional contour of said housing when said first member is in a storage position; and,
   (d) means for extension and retraction of said flexible filter member from within said housing.

9. The system as recited in claim 8 where said bridge support means includes a second member hingedly coupled to said first member, said second member being formed with a cutout portion adapted to matingly interface with a portion of said user's nose.

10. The system as recited in claim 9 where said bridge support means includes a clip means coupled to said second member for releasably coupling said flexible filter member thereto.

11. The system as recited in claim 8 where said housing includes a longitudinal extended recess for storage of a pair of tubular ear support members having an axially extended bore formed therein, each of said pair of ear support members being pivotedly coupled to an opposing end of said housing within said recess.

12. The system as recited in claim 11 where each of said ear support members is slidingly coupled to a flexible member reversibly extendable from within said bore of said ear support member.

13. The system as recited in claim 5 where said system further comprises means for cleaning said flexible filter member during extension and retraction thereof.

14. The system as recited in claim 8 where said means for extension and retraction includes a longitudinally extended roller member rotatably mounted within said housing and extending coaxial said longitudinal axis for storage of said flexible filter member thereon.

15. The system as recited in claim 14 where said means for extension and retraction further includes rotative displacement means coupled to said roller member for extension of said flexible filter member responsive to said rotative displacement in a first direction and for retraction of said flexible filter member responsive to said rotative displacement in a second direction.

16. The system as recited in claim 15 where said rotative displacement means includes knob means coupled to said roller member for rotation of said roller member responsive to rotation of said knob means, said knob means including means for resisting said rotation of said roller member.

17. The system as recited in claim 15 where said rotative displacement means includes drive means disposed within said housing for rotating said roller member responsive to a linear displacement of a knob member coupled thereto.

18. The system as recited in claim 17 where said drive means includes:
   (a) at least one worm gear coupled to one end of said roller member;
   (b) at least one gear member drivingly engaged to said worm gear;
   (c) a first pulley member disposed at one end of said roller member and coupled to said gear member for rotation thereof;
   (d) a second pulley member disposed at an opposing end of said roller member;
   (e) a flexible drive member extending between said first and second pulley members in a continuous loop for causing rotation of said first and second pulley members responsive to a linear displacement thereof; and,
   (f) a knob member fixedly coupled to said flexible drive member and extending therefrom through a longitudinally directed slotted through opening formed in said housing.

19. The system as recited in claim 8 where said system further comprises a chain member coupled on opposing ends to opposing ends of said housing, said chain member being of sufficient length to pass around a neck portion of said user.

* * * * *